United States Patent [19]

Haws

[11] Patent Number: 4,497,113
[45] Date of Patent: Feb. 5, 1985

[54] ASPARAGUS CUTTER

[76] Inventor: Spencer K. Haws, P.O. Box 315, Mesa, Wash. 99343

[21] Appl. No.: 524,184

[22] Filed: Aug. 17, 1983

[51] Int. Cl.³ .......................... B26B 27/00; B26D 5/10
[52] U.S. Cl. .................................... 30/124; 56/327 A
[58] Field of Search ......................... 56/327 R, 327 A; 30/124, 294, 314, 315

[56] References Cited

U.S. PATENT DOCUMENTS

| | | | |
|---|---|---|---|
| 777,963 | 12/1904 | Link | 30/315 |
| 887,466 | 5/1908 | Davis | 56/327 A |
| 986,773 | 3/1911 | Smith | 56/327 A |
| 2,199,330 | 5/1940 | Waloraven | 30/294 |
| 2,269,210 | 1/1942 | Kunz | 30/315 |
| 2,322,926 | 6/1943 | Dorland | 56/327 A |
| 2,473,152 | 6/1949 | Kreutzer | 30/124 |
| 2,610,397 | 9/1952 | Sutton | 56/327 A |

*Primary Examiner*—Paul J. Hirsch
*Attorney, Agent, or Firm*—Townsend & Townsend

[57] ABSTRACT

An apparatus is disclosed for harvesting a ground crop having a stalk such as asparagus. The apparatus includes a flat blade having a holding slot for the stalks being cut located above the cutting edge. The stalks may be held in a queue in the slot until such time as a sufficient collection of stalks has accumulated for unloading. The apparatus is designed as a hand tool which may be used in such a manner to avoid bending over while harvesting the stalks.

7 Claims, 4 Drawing Figures

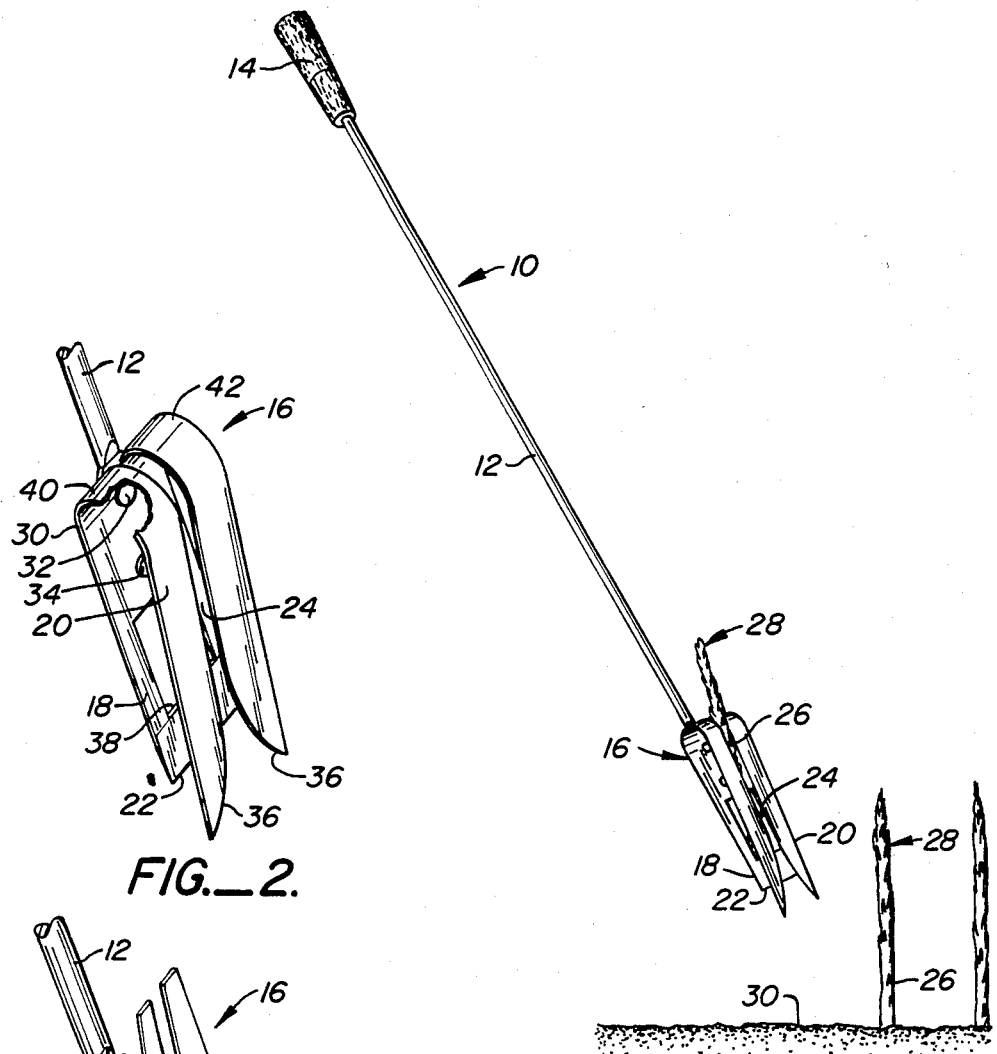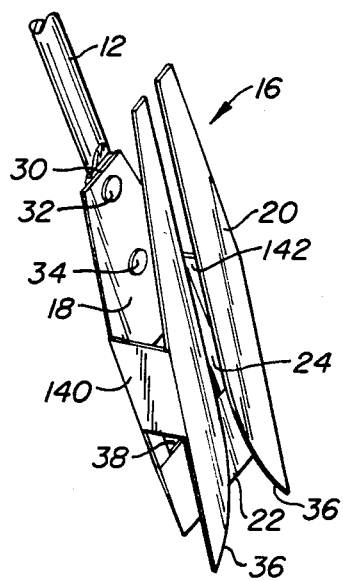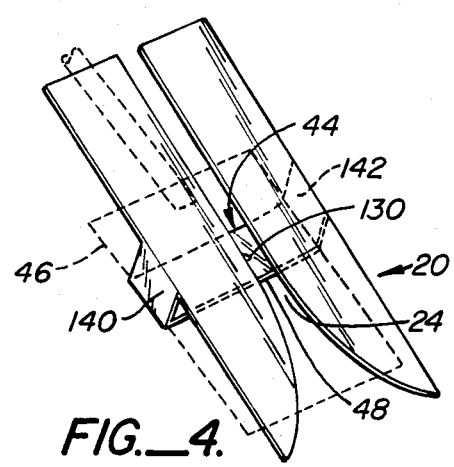
FIG._1.
FIG._2.
FIG._3.
FIG._4.

ASPARAGUS CUTTER

BACKGROUND OF THE INVENTION

This invention relates to agricultural tools and particularly a tool useful for harvesting ground crops where it is advantageous to sever the growth at or slightly below the level of the soil. A particular ground crop of interest is asparagus.

Asparagus is normally harvested by hand by severing the spear at or below ground level with a spade like blade attached to a shaft. A user typically thrusts the blade through the asparagus spear and bends over to retrieve the cut spear. Harvesting asparagus is a highly fatiguing manual labor. What is needed is a tool which will reduce the labor.

SUMMARY OF THE INVENTION

According to the invention, an apparatus is provided for harvesting ground crops, such as asparagus in spears, which comprises means for cutting the stalk of the crop at ground level and means for holding the stalk in a queue, the holding means being fixedly positioned to receive the stalk upon cutting. The holding means is preferably a slot formed in a plate attached to the cutting blade and spaced from the cutting blade so that the slot is generally parallel to the cutting blade.

The holding means may further comprise guide means at the forward most edges of the slot for a aligning stalks with the cutting blade so that the stalks become lodged in the slot in the course of the cutting motion.

A tool of the type herein described enables a user to stand at full height while cutting several stalks sequentially and automatically gathering several stalks in a queue in the slot. The tool thus loaded can be lifted and cleared of the stalks without having to bend over.

In an alternative embodiment, the holding means may be attached to a spade like blade as a retro-fit item.

The invention would be better understood by reference to the following detailed description taken in connection with the accompanying drawings.

BRIEF DESCRIPTION OF THE DRAWINGS

FIG. 1 is a perspective view of an apparatus according to the invention as it might be used.

FIG. 2 is a perspective view of a first embodiment of the cutting means and the holding means of the invention.

FIG. 3 is a perspective view of a second embodiment of the apparatus according to the invention.

FIG. 4 is a third embodiment of the apparatus according to the invention.

DESCRIPTION OF SPECIFIC EMBODIMENTS

The apparatus according to the invention is explained in connection with a particular ground crop, namely asparagus. It is to be understood that this tool, although commonly designated an asparagus knife, may well be used to harvest any other ground crops having stalks.

Referring to FIG. 1, there is shown an asparagus knife 10 comprising a handle 12 formed by a shaft with a grip 14 at one end, and having a head 16 at the other end.

The head 16 comprises two elements, a cutting means 18 and a holding means 20. The principal element of the cutting means 18 is a blade 22 at the leading edge. The principal element of the holding means 20 is a slot 24, as hereinafter explained.

The knife 10 is used by thrusting the head 16 through the stalk 26 of a plant 28 at or near the level of the ground 30. The slot 24 holds plants 28 by the stalk 26 in a queue until removed by hand.

FIG. 2 illustrates in greater detail construction of one type of head 16 according to the invention. The same designation numerals as used in FIG. 1 are used in FIG. 2 and throughout this description to designate identical or similar features. The holding means 20 defines the slot 24 adjacent the cutting means 18 and is fixedly positioned in relation thereto. The blade 22 of the cutting means 18 is formed by a sharpened leading edge. The handle 12 is attached to extend from the trailing margin 30 of the cutting means 18, as for example by rivets 32 and 34.

The holding means 20 includes the further feature of a guide means 36. The guide means 36 is an extension of the slot 24 forward of the blade 22. The guide means 36 consists of a widening in the slot 24, generally at least to the width of the blade 22. The guide means 36 extends in front of the blade 22 so that a stalk is introduced in alignment with the slot 24 prior to being severed by the blade 22. In normal disposition, the guide means 36 is generally above the blade 22, since the blade 22 is normally thrust into the ground, which holds the stalk in a position to allow the blade 22 to sever the stalk.

The cutting means 18 further includes means defining a void or hole 38 disposed behind the leading edge of the blade 22. Specifically, the forward or leading end of the slot 24 nearer the blade 22 may be spaced nearer the surface of the cutting means 18 than is the rear or trailing end of the slot 24. This disposition of spacing has been found to aid in the accommodation of a plurality of stalks in the slot 24.

The holding means 20 is attached to the cutting means 18 by means of spars 40 and 42 thereby to join the trailing margin 30 of the cutting means 18 with the trailing end of the slot 24. The spars 40 and 42 have enough flexure to permit the slot 24 to spread laterally in order to accommodate stalks of varying sizes.

Referring to FIG. 3, there is shown a perspective view of another embodiment of the head 16 according to the invention. Identical features are labeled as in the prior Figures. In this embodiment, however, spars 140 and 142 are disposed along the side margins spanning the space between the cutting means 18 and the holding means 20. The slot 24 may extend rearwardly as far as is convenient to accommodate a plurality of stalks. The spars 140 and 142 may also be of sufficient flexibility to accommodate stalks of differing size, should this feature be necessary or advantageous. This structure has another advantage. It has been found that the stalks can be removed easily by simply pulling the stalks rearwardly through the slot 24. Thus the user need not stoop or lift the tool very far in order to remove the stalks from the slot 24.

FIG. 4 illustrates another embodiment of the invention comprising the holding means 20 with attaching means 44 for attaching the holding means 20 to a spade like cutting tool 46. The attaching means comprises a strap 48 spanning between spars 140 and 142. The strap 48 is provided with rivets 130 or the like to attach the same to the surface of the cutting tool 46. Thus, conventional cutting tools can be adapted to add the holding means 20 in accordance with the invention.

The structure of the head 16 and all of its elements is typically that of the common steel plate material used to form the heads of knives, shovels or hoes. Spring steel, as used in saw blades, may also be employed if additional resilience and flexure are desired. Other materials will be apparent to those of skill in the art.

The invention has now been explained with reference to specific embodiments. Other embodiments will be apparent those of ordinary skill in the art. It is therefore not intended for this invention be limited, except as indicated by the appended claims.

I claim:

1. An apparatus for harvesting a ground crop having a stalk, such as asparagus spears, said apparatus comprising:

means for cutting said stalk at ground level, said cutting means consisting of a sharpened leading edge formed of a substantially flat metal plate; and means for holding said stalk in a queue, said stalk holding means consisting of metal plate materials defining a slot adjacent said cutting means for holding said stalk queue, said slot defining means having a stalk entry end forward of said sharpened leading edge, a stalk exit end rearward of said cutting means and a path between said entry end and said exit end of approximately the width of a stalk, said entry end being substantially wider than a stalk width for capturing said stalk in said queue prior to cutting of said stalk, said exit end being open to permit rearward withdrawal of a collection of each said stalk through said queue, said slot defining means being fixedly positioned relative to said cutting means to receive and hold each said stalk in said queue upon cutting of said stalk by said cutting means.

2. The apparatus according to claim 1 wherein said cutting means includes means defining a void disposed trailing said leading edge to permit passage of debris past said blade.

3. The apparatus according to claim 2 wherein said exit end is spaced further from said cutting means than said entry end closest to said leading edge for drawing each said stalk away from said cutting means as each said stalk is advanced along said path in said slot.

4. The apparatus according to claim 3 wherein said holding means includes means forming first and second spars, said first and second spars attaching said holding means to said cutting means with flexure only at opposing lateral margins to permit said slot forming means to spread laterally as said stalks are stacked in said queue.

5. In an apparatus for harvesting a ground crop having a stalk, such as asparagus spears, said apparatus including spade-like means for cutting said stalk at ground level, the improvement comprising:

means to be fixedly attached to said spade-like means for holding said stalk in a queue, said stalk holding means consisting of metal plate materials defining a slot adjacent said cutting means for holding said stalk queue, said slot defining means having a stalk entry end forward of said sharpened leading edge, a stalk exit end rearward of said cutting means and a path between said entry end and said exit end of approximately the width of a stalk, said entry end being substantially wider than a stalk width for capturing said stalk in said queue prior to cutting of said stalk, said exit end being open to permit rearward withdrawal of a collection of each said stalk through said queue, said slot defining means being fixedly positioned relative to said cutting means to receive and hold each said stalk in said queue upon cutting of said stalk by said spade-like cutting means.

6. The apparatus according to claim 5 wherein said exit end is spaced further from said cutting means than said entry end closest to said leading edge for drawing each said stalk away from said cutting means as each said stalk is advanced along said path in said slot.

7. The apparatus according to claim 5 wherein said holding means includes means forming first and second spars attaching said holding means to said cutting means with flexure at opposing lateral margins to permit said slot forming means to spread laterally as said stalks are stacked in said queue.

* * * * *